United States Patent [19]

Hanway et al.

[11] 4,146,383

[45] Mar. 27, 1979

[54] COMBINATION OF GROUND AND FOLIAR APPLICATION OF FERTILIZER

[76] Inventors: John J. Hanway, 215 Park Ridge Cir., Ames, Iowa 50011; Ramon Garcia, 8052 Ravenwood, #502, Houston, Tex. 77055

[21] Appl. No.: 788,932

[22] Filed: Apr. 19, 1977

Related U.S. Application Data

[63] Continuation of Ser. No. 638,972, Dec. 8, 1975, abandoned.

[51] Int. Cl.$^2$ .......................... C05B 15/00; C05C 9/00
[52] U.S. Cl. .......................... 71/29; 71/53 B; 71/64 C; 71/64 G; 47/58; 47/DIG. 4; 47/DIG. 13
[58] Field of Search .................. 71/29, 30, 32, 33, 53, 71/63, 64 C, 64 G; 47/1.5, 1.7, 58, DIG. 4, DIG. 11, DIG. 13

[56] References Cited

U.S. PATENT DOCUMENTS

| | | | |
|---|---|---|---|
| 2,047,874 | 7/1936 | Kerns | 71/DIG. 13 |
| 2,245,867 | 9/1936 | Mehrhel | 47/DIG. 13 |
| 2,663,629 | 7/1950 | Semon | 71/30 |
| 2,802,307 | 8/1957 | Belasco | 47/58 |
| 2,869,996 | 1/1959 | Vierling | 71/30 |
| 2,950,183 | 8/1960 | Nikitin | 47/DIG. 13 |
| 3,087,806 | 4/1963 | Martin | 47/DIG. 13 |
| 3,179,509 | 4/1965 | Schuman | 71/53 |
| 3,369,885 | 2/1968 | Takahashi | 71/29 |
| 3,558,300 | 1/1971 | Wagner | 47/58 |
| 4,038,064 | 7/1977 | Clapp et al. | 71/29 |

FOREIGN PATENT DOCUMENTS

| | | | |
|---|---|---|---|
| 1378762 | 12/1964 | France | 71/33 |
| 1148986 | 9/1966 | United Kingdom | 47/DIG. 4 |

OTHER PUBLICATIONS

Na-Churs Programs are Best Under the Sun, Richfield Springs, NY, 3/70, pp. 15 and 16.

*Primary Examiner*—Charles N. Hart
*Assistant Examiner*—Ernest G. Therkorn
*Attorney, Agent, or Firm*—Tilton, Fallon, Lungmus & Chestnut

[57] ABSTRACT

Legume grain crops growing under field conditions are supplied exclusively with nutrients from the ground (N, P. K, and S) until the legumes have reached a growth stage in which the seeds are starting to fill, and then during the seed filling period the leaves of the plants are sprayed with an aqueous fertilizer solution providing N, P, K, and S nutrients. Seed yields are appreciably increased. The method is particularly applicable to soybeans.

14 Claims, No Drawings

COMBINATION OF GROUND AND FOLIAR APPLICATION OF FERTILIZER

RELATED APPLICATION

This is a continuation application of co-pending application Ser. No. 638,972, filed Dec. 8, 1975, now abandoned.

BACKGROUND OF INVENTION

In foliar feeding of plant nutrients, the nutrients are dissolved in water and the aqueous solution of nutrients is sprayed on the leaves of the plants. U.S. Pat. No. 3,087,806 describes a method for improving the yield of soybeans by spraying the plants periodically throughout their growth with an aqueous solution of urea phosphate. The patent recommends twice weekly applications, and in an example such twice weekly sprayings were carried out for a period of 18 weeks.

U.S. Pat. No. 3,558,300 describes a method for foliar feeding of field crops including soybeans and cereal grains, with an aqueous solution of an ammonium polyphosphate. Adequate ground fertilizer is employed in conjunction with the foliar feeding. It is claimed that the method improves the stress resistance of the plants. The ammonium polyphosphate solution is described as being applied during the crop growth period up to the flowering period.

Unsuccessful results from foliar fertilization in increasing seed yield have been reported by Mederski and Volk for wheat, corn, soybeans, oats and alfalfa. When the field crops were grown in soils with adequate fertility they failed to respond positively to foliar sprays containing N, P, and K. Mederski, H. J. and Volk, G. W. *Foliar Fertilization of Field Crops*, Ohio Agr. Exp. Sta. Research Cir. 35, (Aug. 1956). It has been generally assumed that legume and cereal grain crops which have adequate ground fertilization will not produce significantly higher yields of the grain by supplemental foliar fertilization, although it has been recognized that the nutrients in the spray are absorbed by the leaves of the plants.

During the vegetative period of plant growth, the amount of nutrients that can be applied as a foliar spray without causing severe "burning" of the leave is not sufficient in itself to supply the nutrient needs of the grain crop plants for very long periods. Consequently, it has been thought necessary to make frequent applications of foliar sprays over the entire growing season to maintain the nutrient content of the plants. Moreover, where the soil contains adequate available nutrients, plants during their vegetative period of growth feed effectively on the soil nutrients. Therefore, for legume and cereal crops fertilizers have been applied to the soil to supply all the required nutrients. Nutrient deficiencies in the soil can be readily corrected by varying the formulas of the fertilizer. Consequently, no need has been generally recognized for supplemental foliar feeding. It has been stated in general that "foliar feeding is often effective when roots are unable to absorb sufficient nutrients from the soil," and that "at flowering many crop plants, having achieved their maximum leaf surface, show a marked depression in general overall metabollic activity, including nutrient uptake by the roots," suggesting that "foliar applications of nutrients should be especially beneficial under such conditions." Wittwar, S. G., Bukovac, M. J., Tukey, H. B., "Advances in Foliar Feeding of Plant Nutrients," Chap. 13, p. 447, *Fertilizer Technology and Usage* (1963, Soil Sc. Soc. of Amer, Madison, Wisc.).

However, prior to the present invention only limited success has been achieved with the foliar feeding of legume and cereal grain crops. For soybeans, the focus of research has been on the weeks immediately prior to the onset of flowering. This period is believed by some to be a vegetative growth stage in which the soybean crop needs more N than the soil can usually provide. deMooy, C. J., Pesek, J., Spaldon, E., "Mineral Nutrition," Chap. 9, p. 280, *Soybeans: Improvement, Production, and Uses*, No. 16 in The Series Agronomy (1973, Amer. Soc. Agron., Madison, Wisc.). Iwata and Utada applied N in various stages of growth, and found that soybean yields were reduced most by withholding N during the period 2 to 3 weeks prior to flowering. Withholding N for one month before this critical period, or for any 2-week period after flowering, did not lead to any large reduction in yield. Iwata, M. and Utada, A. J. Jap. Soc. Hort. Sci. (1967, Tokyo) 37 (1): 57–66 (J.e). Neunylov and Slabko also have reported that N supplied just prior to flowering gave positive responses, including more abundant flowering and higher yield of soybeans. N application after the onset of flowering did not give the same effect. Neunylov, B.A., and Y.I. Slabko, *Agrokhimiya* 11:45–51 (1967).

In some recent tests at Iowa State University, Ames, Iowa, Barel and Black found that corn and soybeans were more tolerant of the foliar application of polyphosphates than orthophosphate. Barel, D. and Black, C. A., "A New Wrinkle in Foliar Feeding of Phosphorus," Iowa State University Ext. Ser. Bull. EC-981 (Jan., 1975). As part of a test procedure, Barel and Black grew soybeans plants to maturity in soil treated with N, K, and P, and the plants were sprayed twice with an aqueous solution of the phosphorus compounds, first when the plants were five weeks old and again when the filling of pods were underway. The yields from the foliar treated plants were found to significantly exceed the yields of the unsprayed controls for most of the P compounds tested.

SUMMARY OF THE INVENTION

As distinguished from prior art practices and suggestions, the method of the present invention confines the foliar feeding of nutrients to the legume crop (viz. soybeans) to the seed filling period. More specifically, the plants are supplied with N, P, K and S nutrients from the soil until a growth stage is reached when the seeds are beginning to develop. Then during the time when the seeds are filling, the leaves of the plants are sprayed with an aqueous fertilizer solution providing N, P, K, and S nutrients to the plants. These four nutrients are preferably applied in relatively specific, defined ratios, and the amount of fertilizer applied per acre is controlled to maximize the yield increase without applying more fertilizer than is needed. For the first time, this invention provides a reliable method for consistently and significantly increasing the seed yield of soybeans and related bean, pea and other legume seed crops. The method is therefore different from and produces better results than foliar feeding of such field crops at frequent intervals throughout the growing season, where the much larger amount of applied fertilizer is largely wasted, at least with respect to increasing the seed yield. The method is also distinguishable from the application of fertilizer by foliar feeding during the period prior to the onset of flowering. The beginning of flowering marks the start of the reproductive growth stages of the plants, while seed filling occurs after the flowers have formed seeds and the seeds have started to develop. Under the method of this invention, therefore, the period of time during which foliar feeding is carried out is quite limited, and the number of required applications and the amounts of fertilizer applied are also relatively limited. Maximum results are therefore obtained for minimum expense.

Heretofore, it has not been known that the yield of seed crops can be significantly increased by confining foliar feeding exclusively to the seed filling period. In relation to the state of the art, this is an unexpected and unobvious finding. However, in retrospect, certain theoretical findings appear relevant.

In experiments with soybean plants reported several years ago, Hanway and Weber found that there was a late season decrease in N, P, and K in all plants parts, except in the seeds, regardless of whether N, P, and K fertilizer had been applied to the soil. It was hypothesized that these nutrients were translocated to the seeds as they developed and were lost from other plant parts even though the nutrients were readily available in the soil. Hanway, J. J. and Weber, C. R., *Agronomy Journal*, 63, p. 286–290 (Mar.–Apr., 1971). In further related studies, the same workers determined that 75 to 80% of the total accumulation of N, P, and K, nutrients by soybean plants occured during a 46-day period between developmental Stages 5 and 9 (as defined by Kalton, et al, Iowa Agr. Exp. Sta. Res. Bul. 359), extending from the growth stage where the plants are in full bloom to that where the beans are approaching "green bean" stage. These stages correspond to Stages R2 and R6 by the more recent system of Fehr, et al, as described below. It was also observed that approximately half of the N, P, and K in the mature seeds was translocated from other plant parts during seed development. *Agronomy Journal*, 63, 406–408 (may–June, 1971).

More recently, Sinclair and deWit, have reported photosynthate and nitrogen requirements for seed production by various crops. For soybeans and related bean and pea crops, it was hypothesized that to sustain the calculated rates of seed biomass production, a portion of the nitrogen requirement must be obtained from the vegetative plant parts by nitrogen mobilization. Sinclair, T. R. and deWit, C. T. *Science*, 189, 565–567 (Aug., 1975). This article does not discuss foliar feeding and consider any N requirements.

In the method of the present invention, the plants are provided with a balanced supply N, P, K and S by foliar feeding during seed filling. Apparently, one of the mechanisms underlying the present invention, which has not heretofore been fully appreciated is that during seed filling, photosynthate sugar is channeled to the developing seeds at the expense of the roots and nodules of the soybeans, which therefore receive little food to serve as an energy source for taking up nutrients from the soil. Other mechanisms may also be involved. Because during seed filling there is a translocation of nutrients from the leaves to the developing seeds, the depletion of the nutrient content of the leaves may reduce the time and rate of photosynthesis in the leaves, thereby limiting the total photosynthate food production, which further tends to inactivate the soybean roots so that symbiotic N-fixation does not continue to supply N to the plants.

DETAILED DESCRIPTION

The present invention provides a method of increasing the seed yield of a legume grain crop growing under field conditions in ground containing an adequate supply of available plant nutrients including sources of N, P, K and S. Nutrients are supplied to the growing legumes exclusively from the ground until the legumes have reached a growth stage in which the seeds are starting to fill. Then, during the seed filling period, the leaves of the legumes are sprayed with an aqueous fertilizer solution providing, N, P, K·and S nutrients to the plants.

The method is particularly applicable to the cultivation of soybeans, including both Northern and Southern varieties. However, it can also be applied to other legume field crops which are raised for the production of dry seeds, such as dry beans, dry peas, lentils, chick peas, pigeon peas, and crow peas; and to other crops believed to require nutrient ratios similar to soybeans for foliar feeding, namely to cotton, peanuts, flax, and sunflower.

The method is also believed to be applicable to the cultivation of field corn (maize) and other cereal grain crops, including sorghum, wheat, oats, barley, rye, millet, rice and popcorn. However, the ratios of N, P, K, and S nutrients for such cereal grain crops applied by foliar feeding during seed filling is different than that for legume crops, and also the applied amounts of the fertilizers are desirably different than for legume crops. Further, foliar feeding of K can be omitted, feeding only N, P and S. These differences will be further discussed and illustrated below. Other field crops believed to require nutrient ratios similar to corn for foliar feeding during seed filling are rape, safflower, and sesame.

The seed filling period for legume crops and other field crops can be determined by visual inspection. It occurs subsequent to the flowering stage, after the seeds have formed and started to fill. For soybeans, the Vegetative and Reproductive Stages have been defined by Fehr, et al *Crop Science*, 11, 929–931 (Nov.–Dec., 1971) as follows:

VEGETATIVE STAGES

Vegetative stages are determined by counting the number of nodes on the main stem, beginning with the unifoliolate node, which have or have had a completely unrolled leaf. A leaf is considered completely unrolled when the leaf at the node immediately above it has unrolled sufficiently so the two edges of each leaflet are no longer touching. At the terminal node on the main stem, the leaf is considered completely unrolled when the leaflets are flat and similar in appearance to older leaves on the plant.

| Stage No. | Description |
| --- | --- |
| V1 | Completely unrolled leaf at the unifoliolate node. |
| V2 | Completely unrolled leaf at the first node above the unifoliolate node. |
| V3 | Three nodes on main stem beginning with the unifoliolate node. |
| V(N) | N nodes on the main stem beginning with the unifoliolate node. |
| Reproductive Stages | |
| Stage No. | Description |
| R1 | One flower at any node. |
| R2 | Flower at node immediately below the uppermost node with a completely unrolled leaf. |
| R3 | Pod 0.5 cm (¼ inch) long at one of the four uppermost nodes with a completely unrolled leaf |

-continued

| | |
|---|---|
| R4 | Pod 2 cm (¾ inch) long at one of the four uppermost nodes with a completely unrolled leaf. |
| R5 | Beans beginning to develop (can be felt when the pod is squeezed) at one of the four uppermost nodes with a completely unrolled leaf. |
| R6 | Pod containing full size green beans at one of the four uppermost nodes with a completely unrolled leaf. |
| R7 | Pods yellowing; 50% of leaves yellow. Physiological maturity. |
| R8 | 95% of pods brown. Harvest maturity. |

As used herein, the terms Vegetative Stages and Reproductive Stages with respect to soybeans have the meanings set out above. With respect thereto, the foliar feeding of soybeans according to the method of this invention is preferably confined to the period between Reproductive Stages R5 and R7. In other words, the nutrients are supplied from the soil to the plants up through the R4 stage, which in general corresponds to about V14 to V16 Vegetative Stage, and the foliar feeding is applied during the R5 to R7 Reproductive Stages. During these stages, the vegetative growth of the plant substantially stops, the plants usually reaching their maximum Vegetative Growth, corresponding to a V17 to V20 growth stage at about Reproductive Stage R5 to R6.

In practicing the method of this invention for soybeans, the nutrient ratios and applications rates set out below in Table A can be used.

Table A

| | Nutrient Ratios and Application Rates for Soybeans | | | |
|---|---|---|---|---|
| | Solution Ratios ($P_2O_5$ as 1) | | Amounts (total lbs/acre) | |
| Nutrient | Preferred | Broad | Preferred | Broad |
| N | 4-5 | 2-7 | 30-90 | 10-150 |
| P (as $P_2O_5$) | 1 | 1 | 8-20 | 4-40 |
| K (as $K_2O$) | 1.4-1.8 | 0.5-3 | 12-30 | 5-60 |
| S | 0.15-0.25 | 0.05-0.5 | 2-5 | 1-10 |

The preferred solution ratios can be utilized within the stated broad ranges for application amounts. Similarly, the preferred application amounts can be achieved by utilizing ratios within the stated broad ranges. However, best results are obtained when the preferred solution ratios are utilized, and the solution is applied to achieve the preferred application amounts with a plurality of sprayings.

The solution rates and application amounts of Table A can be used generally for legume grain crops. These include dry beans, dry peas, lentils, chick peas, pigeon peas, and cow peas. Other crops for which this ratio is desirable include cotton, peanuts, flax, and sunflower. By way of specific example, particularly desirable nutrient ratios for soybeans and other similar crops on the basis $N:P_2O_5:K_2O:S$ are 4.6:1:1.6:0.2.

In practicing the present invention for field corn (maize), the nutrient ratios and application rates set out below in Table B can be used.

Table B

| | Nutrient Ratios and Application Rates for Corn (Maize) | | | |
|---|---|---|---|---|
| | Solution Ratios ($P_2O_5$ as 1) | | Amounts (total lbs/acre) | |
| Nutrient | Preferred | Broad | Preferred | Broad |
| N | 2-2.5 | 1-4 | 20-50 | 10-100 |
| P (as $P_2O_5$) | 1 | 1 | 8-20 | 4-40 |
| K (as $K_2O$) | 0.25-0.75 | 0-2 | 4-10 | 0-30 |
| S | 0.15-0.25 | 0.05-0.5 | 2-5 | 1-10 |

The preferred solution ratios, as set out in Table B, can be used to obtain the broad application amounts. Similarly, the preferred application amounts can be achieved by using ratios within the stated broad ratios. However, for best results it is advantageous to employ the preferred solution ratios to achieve the preferred application amounts with a plurality of sprayings. As will be noted, potassium (K) can be omitted, although it is preferably included.

The nutrient ratios and application rates of Table B can be used generally for cereal grain crops, including sorghum, wheat, oats, barley, rye, millet, rice and popcorn. Other field crops for which the same ratios can be used are rape, safflower, and sesame. By way of specific example, particularly advantageous ratio for corn, cereal grains generally, and the other field crops on a $N:P_2O_5:K_2O:S$ basis is 2.2:1:0.5:0.2.

Prior to planting, or as required during the growing season, and prior to the seed filling period, fertilizer nutrients are supplied to the soil, if the soil does not already contain an adequate supply of available nutrients, including N, P, K and S sources. The fertilizers to be used are those which have been conventionally applied as soil fertilizers for the particular field crop.

For foliar feeding during the seed filling period, the nutrients should be in water soluble form. Preferably, they are combined and applied as a single solution, the solution preferably containing soluble compounds providing N, P, K, and S. Nitrogen can be supplied by urea or similar compound. Part of the nitrogen can also be supplied by ammonium salts, such as ammonium sulfate, or as the ammonium phosphate that is produced when super phosphoric acid is neutralized with ammonia to produce ammonium polyphosphate, which is a desirable source of phosphorus. Preferably, most of the P is supplied by polyphosphate, although some orthophosphate and/or pyrophosphate can also be present. The phosphate groups in the polyphosphate can range from 2 to 10, but preferably the polyphosphate containing from 3 to 8 phosphate groups in the polyphosphate molecule is employed. Alternatively, or additionally, compounds such as phosphoryl triamide or phosphonitrilic hexamide can be used.

The potassium and sulfur nutrients to be employed can be in the form of salts containing potassium or sulfur. For example, potassium chloride, bicarbonate, carbonate, etc. can be used. A single salt may be used to provide both potassium and sulfur, such as potassium sulfate, or the salt may provide potassium and phosphorus, such as potassium phosphate, potassium polyphosphate, etc. The sulfur will commonly be present as sulfate, associated with ammonium, potassium, sodium, calcium, or similar cations.

A good base fertilizer is a urea potassium polyphosphate. A sulfur compound can be added, and other compounds, as required to adjust the ratios of N, P, K, and S.

The foliar solutions are preferably substantially free of undissolved fertilizer solids. However, it is preferred to employ concentrated solutions, and to apply the solutions in the form of a fine mist. Conventional field spraying equipment can be used, including sprayers pulled through the fields by tractors, as well as aerial spraying equipment. While the solution concentrations (as distinguished from the nutrient ratios) are not critical, total solid concentrations on a solids to total solution weight basis can advantageously range from about 30 to 45% solids. It is advantageous to add a surfactant to the foliar solutions.

In practicing the present invention, the foliar spray should be applied from 1 to 5 times during the seed filling period. The maximum benefit can usually not be achieved by a single application, and therefore applying the foliar spray a plurality of times is preferred, such as 2 to 4 times during the seed filling period. It is desirable to space out the foliar sprayings for optimum results. Spraying at intervals of at least 5 days apart is desirable. In general, the spraying intervals can range from about 5 to 10 days apart. For example, it is believed that optimum results can be achieved with 3 to 4 sprayings at about a week apart, all sprayings being during the seed filling period.

EXPERIMENTAL DATA

During the summer of 1974, a field experiment was conducted at Ames, Iowa to determine if foliar fertilizer applications during the seed filling period would increase soybean yields. Excessive rain in May delayed planting. Hot, dry conditions in July restricted plant growth and development. An early frost in September before plant maturity reduced yields.

In spite of unfavorable weather, foliar applications of a N-P-K-S solution between developmental stages R5 and R7 increased yields by 7 bu/acre. (check yield = 34bu/A., Treated Yield = 41 bu/A.). Solutions that did not contain all four of the nutrient elements resulted in some yield increase, but less than that obtained from the complete N-P-K-S solution. The increase was due to an increase in number of harvested seeds, not seed size.

During the summer of 1975, additional field experiments were conducted at 4 sites at Ames and Kanawha, Iowa. Planting was delayed slightly by wet conditions in April and early May. Very dry weather in July restricted yield slightly. One experiment was irrigated during this period.

Foliar applications of N-P-K-S solution applied at approximately 4 weekly intervals between developmental stages R5 and R7 (Aug. 12 to Sept. 6) increased yields in each of the experiments. These yield increases varied from 7 to 23 bu/A. (Check yields varied from 37 to 57 bu/A.). The highest check yields and the largest increases in yield due to the foliar treatment were obtained in the experiment that was irrigated during the drought period. This may indicate that maximum benefit will result in fields with normally high yields and in years with adequate moisture.

The optimum ratio of N:P:K:S was 10:1:3:0.5 (N:$P_2O_5$:$K_2O$:S = 4.3:1:1.6:0.2). Where any one of the elements was not included in the spray solution the yield increases were small in comparison to the increases obtained from the complete NPKS solution.

Maximum yield increases resulted where the total of the 4 spray applications was 70 to 90 lbsN/A., 7 to 11 lbsP (16 to 25 lbs $P_2O_5$)/A., 21 to 30 lbs K (25 to 36 lbs $K_2O$)/A., and 3.5 to 8 lbs S/A. Where the spray applications supplied either more or less than these amounts the yield increases were less.

Applications of the complete NPKS solution that exceeded about 25 lbsN/A. at any one application resulted in leaf burn.

The following examples further illustrate preferred modes of practicing the present invention.

EXAMPLE I

For practicing the present invention with soybeans or other legume field crops during the seed-filling period, the following procedure can be used:

Depending upon availability of P and K in the soil, P and K fertilizers may be applied to the soil prior to planting. However, since most soybeans are grown in a corn-soybean cropping system and most farmers apply fertilizers for the corn crop, fertilizer application to the soil for the soybean crop generally is not needed, except on soils with very low availability of P or K. N fertilizers are not commonly applied to the soil for soybeans.

For foliar feeding during the seed filling period, a fertilizer solution containing the appropriate amounts of N, P, K and S is prepared so 180 liters (suitable for application to a hectare in the field) will contain 30 kg N, 6.9 kg $P_2O_5$, 10.8 kg $K_2O$, and 1.5 kg S. (This is equivalent to 26.8 lb N, 6.2 lb $P_2O_5$, 9.6 lb $K_2O$, and 1.3 lb S in 19.3 gallons, which is an appropriate amount to apply per acre). Using urea (45-0-0) as the source of N, a potassium polyphosphate solution (0-26-25) as the source of P and part of the K, and potassium sulfate (0-0-50-18 S) as the source of the remainder of the K and of the S, 180 liters of basic solution containing the above amounts of N, $P_2O_5$, $K_2O$, and S is prepared. This basic solution contains 67 kg of urea, 26.5 kg (10.5 liters) of 0-26-25 solution potassium polyphosphate, and 8.3 kg of potassium sulfate in 180 liters of solution (total solids = 93.3 kg per 180 liters = 51.8 kg/100 liters for 416.6 lb per 100 gallons). An application of this amount (180 liters per hectare or 19.3 gallons/acre) is the optimum amount to apply in one application. An application of 250 liters per hectare is about the maximum amount that can be sprayed on the soybean plants in one application without causing serious leaf burn. The solution can be made less concentrated by adding water so 2 or more times the volume of solution will contain the same amount of fertilizer nutrients, and then the volume of solution sprayed per acre can be increased (within limits) to supply the same quantities of nutrients per unit area or the volume sprayed per unit area can be held constant and reduce the amounts of nutrients applied.

After the soybeans have reached Reproductive Stage R5, the foliar solution prepared as described above is applied at the indicated rate of 19.3 gallons per acre. This results in the application of approximately 27N, 62 $P_2O_5$, 9.6 $K_2O$, 1.3 S lbs per acre. The treatments are repeated every 8 to 10 days for a total of 3 to 4 applications during the seed filling period. For example, one application can be made at the R5 stage, one at the R5.7 stage, and one at the R6.5 stage.

By the foregoing procedure, on the average, it can be expected that yield increases of about 10 to 20 bu/acre will be obtained, corresponding to yield increases of about 25 to 50%.

EXAMPLE II

For practicing the present invention with corn or other cereal grain crops during the seed-filling period, the following procedure can be used:

Fertilizers to supply 100 to 150 lbs N/acre, 50 to 60 lbs $P_2O_5$/acre, and 50 to 60 lbs $K_2O$/acre commonly are applied to the soil before the corn is planted. These should be applied to supply nutrients prior to the seed-filling period.

A fertilizer solution containing the appropriate amounts of N, P, K, and S is prepared so 160 liters (suitable for application to a hectare in the field) will contain 20 kg N, 9.2 kg $P_2O_5$, 6 kg $K_2O$, and 2 kg S. (This is equivalent to 17.8 lbs N, 8.2 lbs $P_2O_5$, 5.4 lbs $K_2O$, and 1.8 lbs S in 17.1 gallons which is an appropriate amount to apply per acre.) Using urea (45-0-0) as the major source of N, ammonium polyphosphate (11-37-0) as the source of P and the N, and potassium sulfate (0-0-50-18 S) as the source of K and S, 160 liters of a basic solution containing the above amounts of N, $P_2O_5$, $K_2O$, and S is prepared. This basic solution contains 39 kg of urea, 24.9 kg (18 liters) of 11-37-0 solution (ammonium polyphosphate), and 12 kg of potassium sulfate in 160 liters of solution (total solids = 79 kg per 160 liters = 49.4 kg/100 liters or 39.68 lb per 100 gallons). An application of this amount (160 liters per hectare or 17.1 gallons/acre) is an optimum amount to apply at any one time. An application of 250 liters per hectare is about a maximum amount that can be sprayed on corn plants in one application without causing serious leaf burn. The solution can be made less concentrated by adding water so 2 or more times the volume of solution will contain the same amount of fertilizer nutrients, and then the volume of solution sprayed per acre can be increased to supply the same quantities of nutrients per unit area or the volume sprayed per unit area can be held constant and reduce the amounts of nutrients applied.

After the corn has reached the "roasting ear" stage, 20 to 25 days after 75% of the plants have silked, the foliar solution prepared as described above is applied at the indicated rate of 17 gallons per acrs. This results in the application of approximately 17.8 lbs N, 8.2 lbs $P_2O_5$, 5.4 lbs $K_2O$ and 1.8 lbs S per acre. The treatments are repeated every 8 to 10 days for a total of 3 applications during the seed-filling period.

By the foregoing procedure, on the average with suitable hybrids, it can be expected that yield increases of about 15 to 30 bu/acre will be obtained, corresponding to yield increases of about 15 to 25%.

I claim:

1. The method of increasing the seed yield of a legume grain crop growing under field conditions in ground containing an adequate supply of available plant nutrients including sources of N, P, K, and S, wherein the improvement comprises: supplying nutrients to said growing legumes exclusively from said ground until the legumes have reached a growth stage in which the seeds are starting to fill, and then during the seed filling period spraying the leaves of said legumes with an aqueous fertilizer solution providing N, P, K, and S nutrients to said legumes, said solution containing on a relative weight basis from 2 to 7 parts of N, from 0.5 to 3 parts K (calculated as $K_2O$), and from 0.05 to 0.5 parts of S per part of P (calculated as $P_2O_5$).

2. The method improvement of claim 1 in which said aqueous solution is sprayed onto said leaves a plurality of times during said seed filling period.

3. The method improvement of claim 1 in which said legume crop is soybeans.

4. The method improvement of claim 1 in which said aqueous solution contains on a relative weight basis from 4 to 5 parts of N, from 1.4 to 1.8 parts of K (calculated as $K_2O$), and from 0.15 to 0.25 parts of S per part of P (calculated as $P_2O_5$).

5. The method improvement of claim 1 in which said legume crop is soybeans, said aqueous solution is sprayed onto said leaves from 2 to 4 times during said seed filling period with an interval of at least 5 days before each repeated spraying, such sprayings on a pounds (lbs) per acre basis resulting in application of a total of from 30 to 90 lbs of N, from 8 to 20 lbs of P (calculated as $P_2O_5$), from 12 to 30 lbs of K (calculated as $K_2O$), and from 2 to 5 lbs of S.

6. The method of increasing the seed grain yield of a legume grain crop growing under field conditions in ground containing an adequate supply of available plant nutrients including sources of N, P, K, and S, wherein the improvement comprises: supplying nutrients to said growing legumes exclusively from said ground until said legumes have reached a growth stage in which the seeds are starting to fill, and then during the seed filling period spraying the leaves of said legumes at least twice with an aqueous fertilizer solution providing N, P, K, and S nutrients to said legumes, said solution containing on a relative weight basis from 4 to 5 parts of N, from 1.4 to 1.8 parts of K (calculated as $K_2O$), and from 0.15 to 0.25 parts of S per part of P (calculated as $P_2O_5$), the total amount of said nutrients supplied on a pounds (lbs) per acre basis ranging from 30 to 90 lbs of N, from 8 to 20 lbs of P (calculated as $P_2O_5$), from 12 to 30 lbs of K (calculated as $K_2O$), and from 2 to 5 lbs of S.

7. The method improvement of claim 6 in which said legume crop is soybeans.

8. The method of claim 6 in which said aqueous solution is sprayed onto said leaves from 2 to 4 times during said seed filling period at intervals of from 5 to 10 days between applications.

9. The method of increasing the seed yield of soybeans growing under field conditions in ground containing an adequate supply of available plant nutrients including sources of N, P, K, and S, wherein the improvement comprises: supplying nutrients to the growing soybean plants exclusively from said ground until said soybean plants have reached a growth stage in which the seeds are starting to fill, and then during the seed filling period spraying said plants a plurality of times at intervals of at least 5 days between each spraying with an aqueous fertilizer solution providing N, P, K, and S nutrients to said soybean plants, during such sprayings on a pounds (lbs) per acre basis applying from 30 to 90 lbs of N, from 8 to 20 lbs of P (calculated as $P_2O_5$), from 12 to 30 lbs of K (calculated as $K_2O$), and from 2 to 5 lbs of S.

10. The method of increasing the seed yield of soybeans growing under field conditions in ground containing an adequate supply of available plant nutrients including sources of N, P, K, and S, wherein the improvement comprises: supplying said nutrients to the growing soybean plants exclusively from said ground until said soybean plants have reached the R5 reproductive growth stage, and during the R5 to R7 reproductive growth stages spraying said plants a plurality of times at intervals of at least 5 days between sprayings with an aqueous fertilizer solution providing N, P, K, and S nutrients to said plants, at least one of said sprayings being carried out during the R6 growth stage, said aqueous solution containing on a weight basis from 4 to 5 parts of N, from 1.4 to 1.8 parts of K (calculated as $K_2O$), and from 0.15 to 0.25 parts of S per part of P (calculated as $P_2O_5$), the total of said sprayings on a pounds (lbs) per acre basis supplying from 30 to 90 lbs of N, from 8 to 20 lbs of P (calculated as $P_2O_5$), from 12 to 30 lbs of K (calculated as $K_2O$), and from 2 to 5 lbs of S.

11. The method of increasing the seed yield of a cereal grain crop growing under field conditions in ground containing an adequate supply of available plant nutrients including sources of N, P, K, and S, wherein the improvement comprises: supplying nutrients to the growing cereal grain crop exclusively from said ground until the cereal grain crop has reached a growth stage in which the seeds are starting to fill, and then during the seed filling period spraying the leaves of the crop with an aqueous fertilizer solution providing N, P, K and S nutrients to said crop, said solution containing on a relative weight basis from 1 to 4 parts of N, from 0 to 2 parts of K (calculated as $K_2O$), and from 0.05 to 0.5 parts of S per part of P (calculated as $P_2O_5$).

12. The method improvement of claim 11 in which said cereal grain crop is corn (maize).

13. The method of increasing the seed yield of a cereal grain crop growing under field conditions in ground containing an adequate supply of available plant nutrients including sources of N, P, K and S, wherein the improvement comprises: supplying nutrients to the cereal grain plants exclusively from said ground until the plants have reached a growth stage in which the seeds are starting to fill, and then during the seed filling period spraying the leaves of said plants with an aqueous fertilizer solution providing N, P, K, and S nutrients to said plants, said solution containing on a relative weight basis from 2 to 2.5 parts of N, from 0.25 to 0.75 parts of K (calculated as $K_2O$), and from 0.15 to 0.25 parts of S per part of P (calculated as $P_2O_5$), the amount of said nutrients supplied on a pounds (lbs) per acre basis ranging from 20 to 50 lbs of N, from 8 to 20 lbs of P (calculated as $P_2O_5$), from 4 to 10 lbs of K (calculated as $K_2O$), and from 2 to 5 lbs of S, said solution being sprayed on said leaves from 2 to 4 times with an interval of at least 5 days before each repeated spraying.

14. The method improvement of claim 13 in which said cereal grain crop is corn (maize).

* * * * *